Sept. 16, 1930.    F. R. FAGEOL    1,775,754
AUTOMOTIVE VEHICLE
Filed May 13, 1927    6 Sheets-Sheet 1
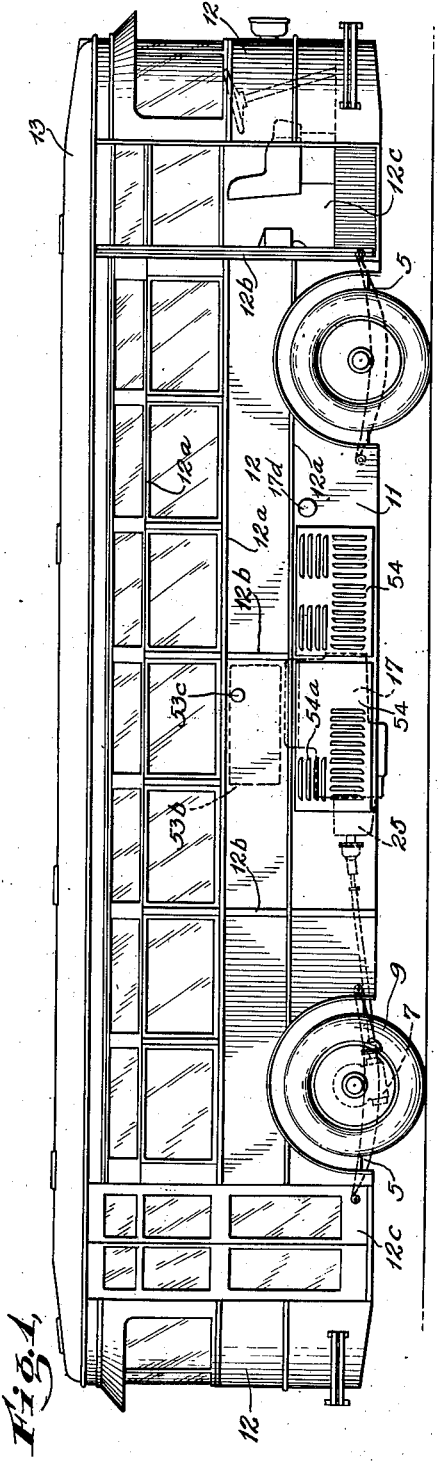
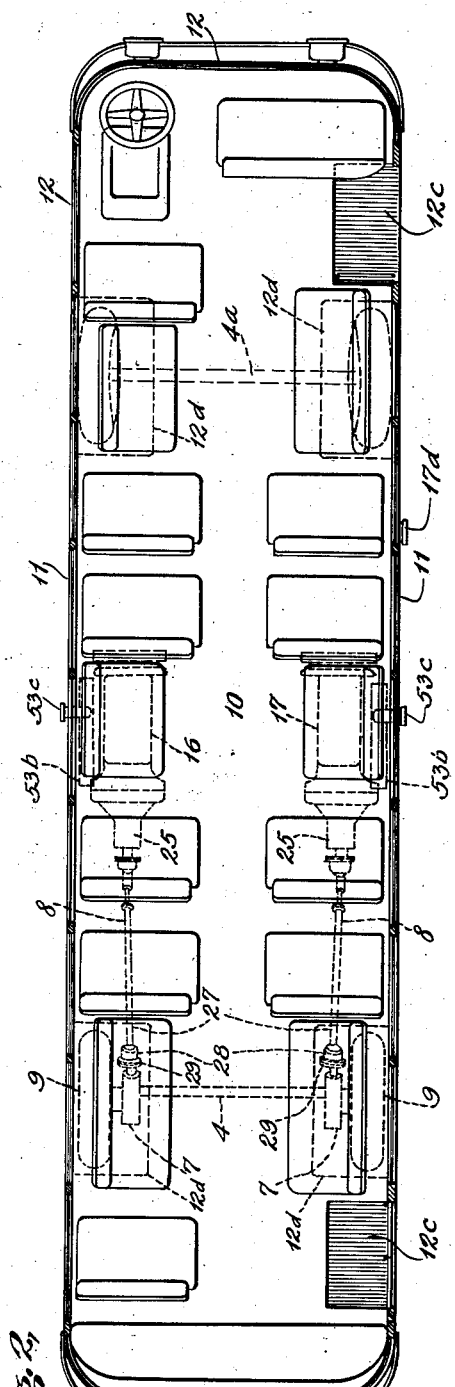
INVENTOR
FRANK R. FAGEOL
BY
ATTORNEY

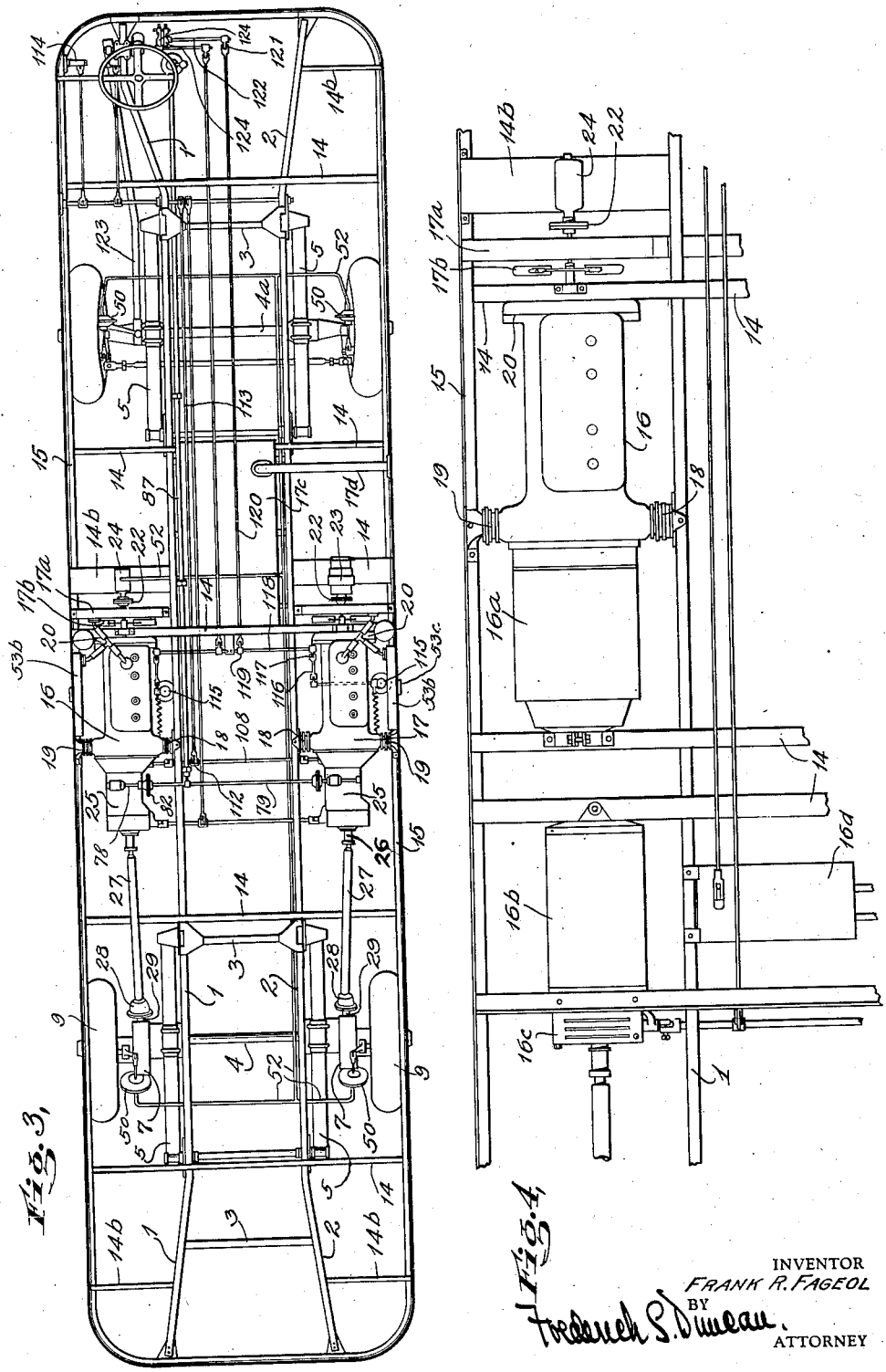

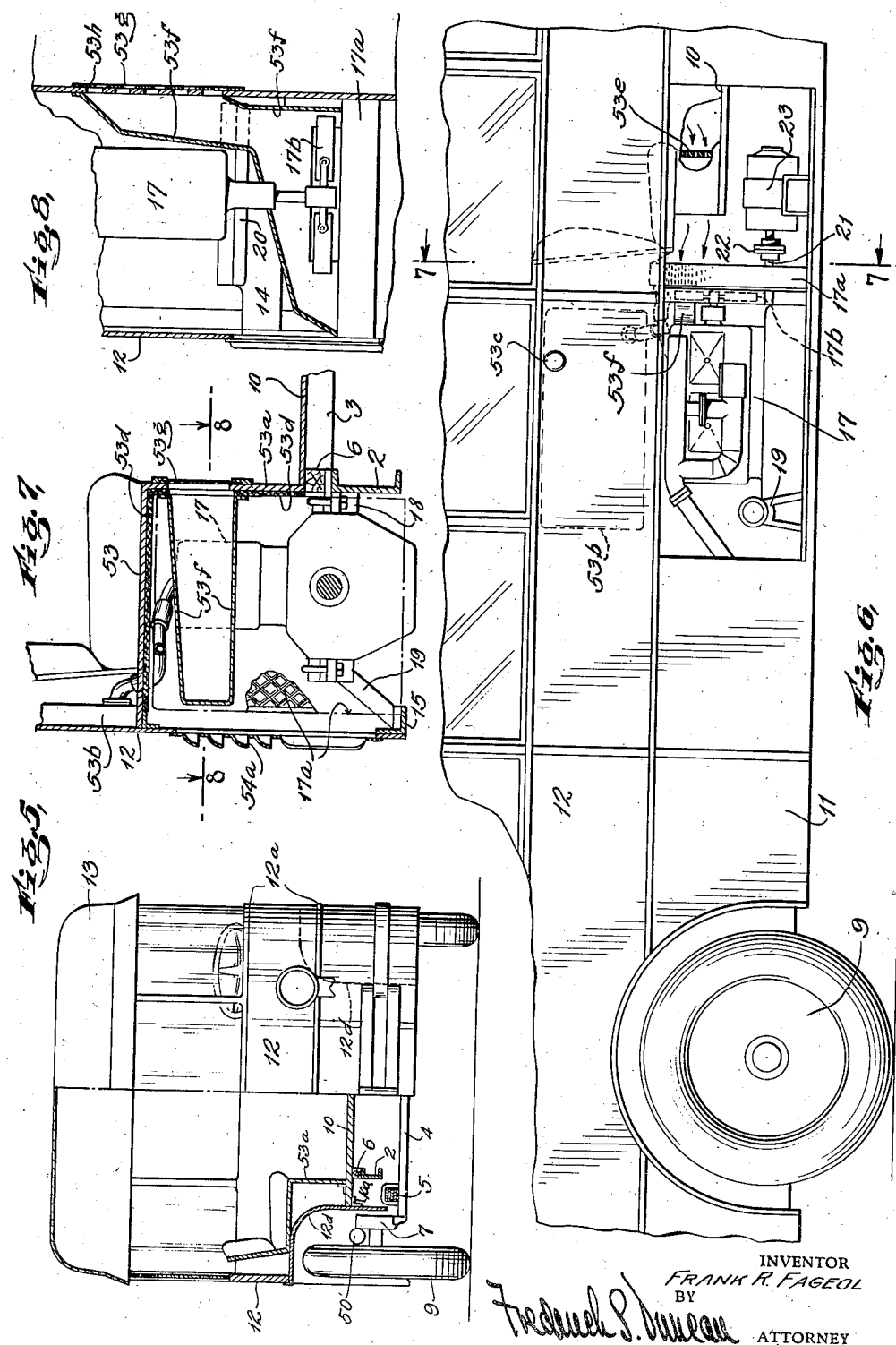

Sept. 16, 1930.  F. R. FAGEOL  1,775,754
AUTOMOTIVE VEHICLE
Filed May 13, 1927   6 Sheets-Sheet 4
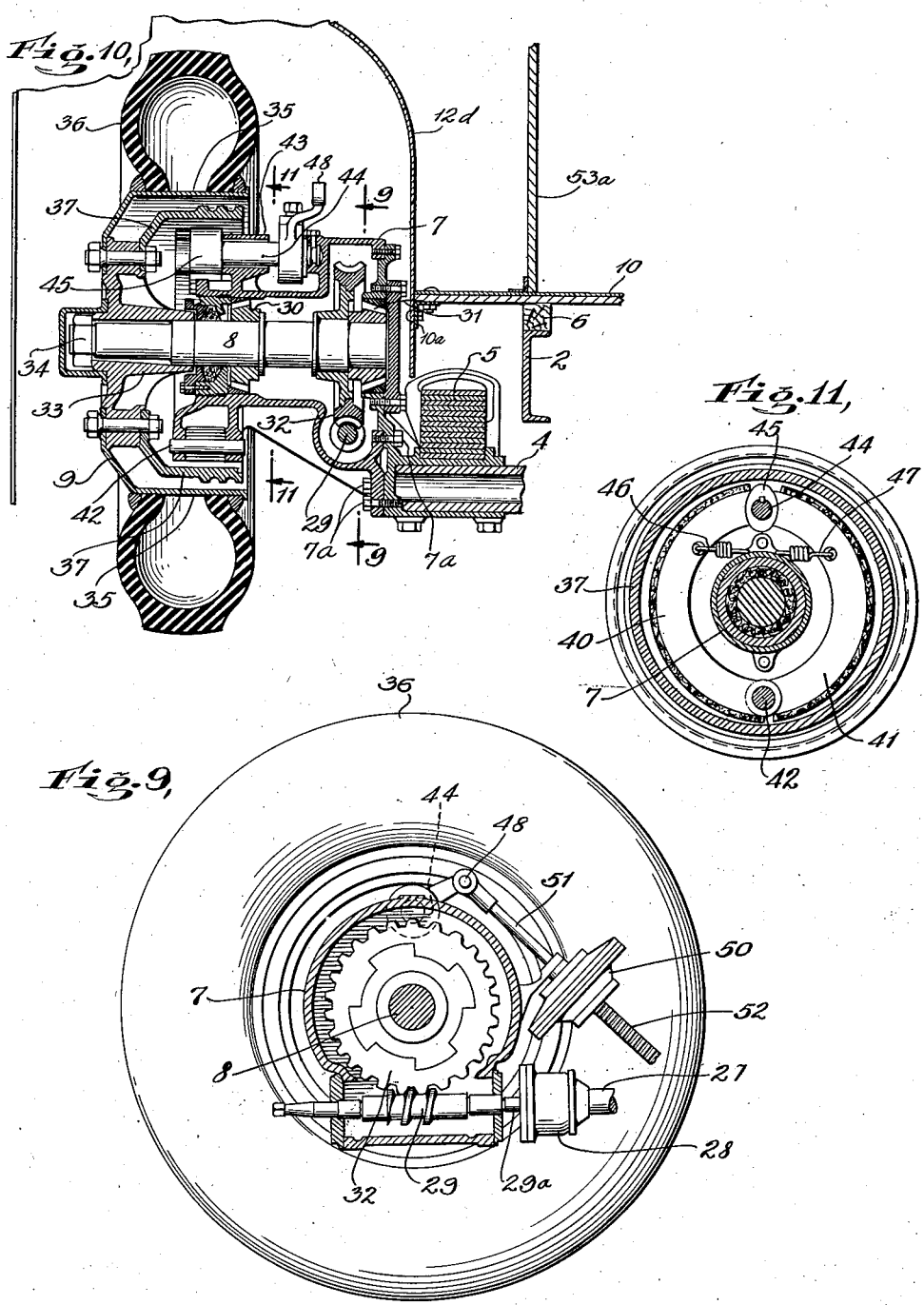
INVENTOR
FRANK R. FAGEOL
BY
Frederick S. Duncan, ATTORNEY Sept. 16, 1930.  F. R. FAGEOL  1,775,754
AUTOMOTIVE VEHICLE
Filed May 13, 1927  6 Sheets-Sheet 5
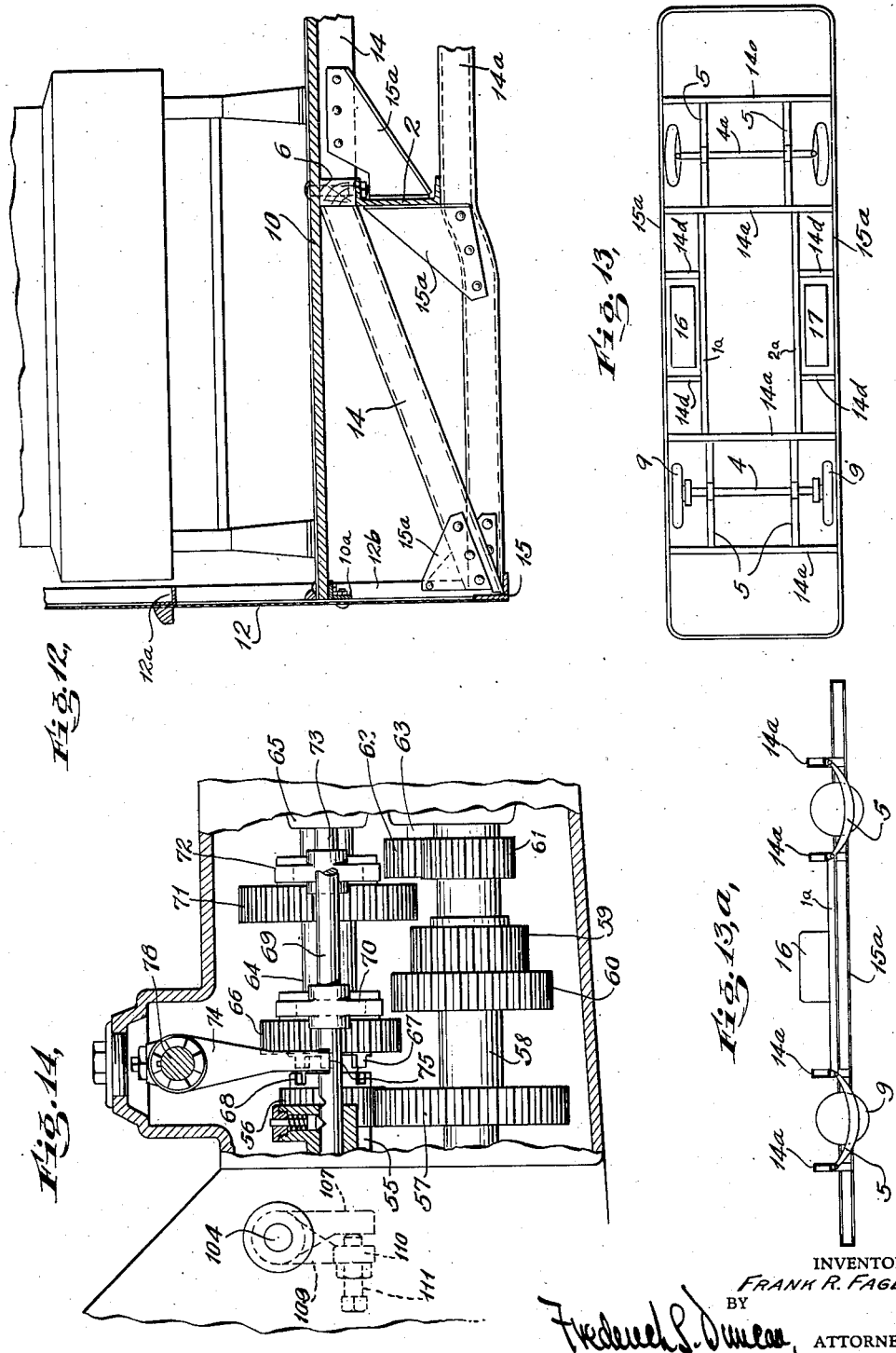
INVENTOR
FRANK R. FAGEOL
BY
Frederick S. Duncan, ATTORNEY Sept. 16, 1930.  F. R. FAGEOL  1,775,754
AUTOMOTIVE VEHICLE
Filed May 13, 1927  6 Sheets-Sheet 6
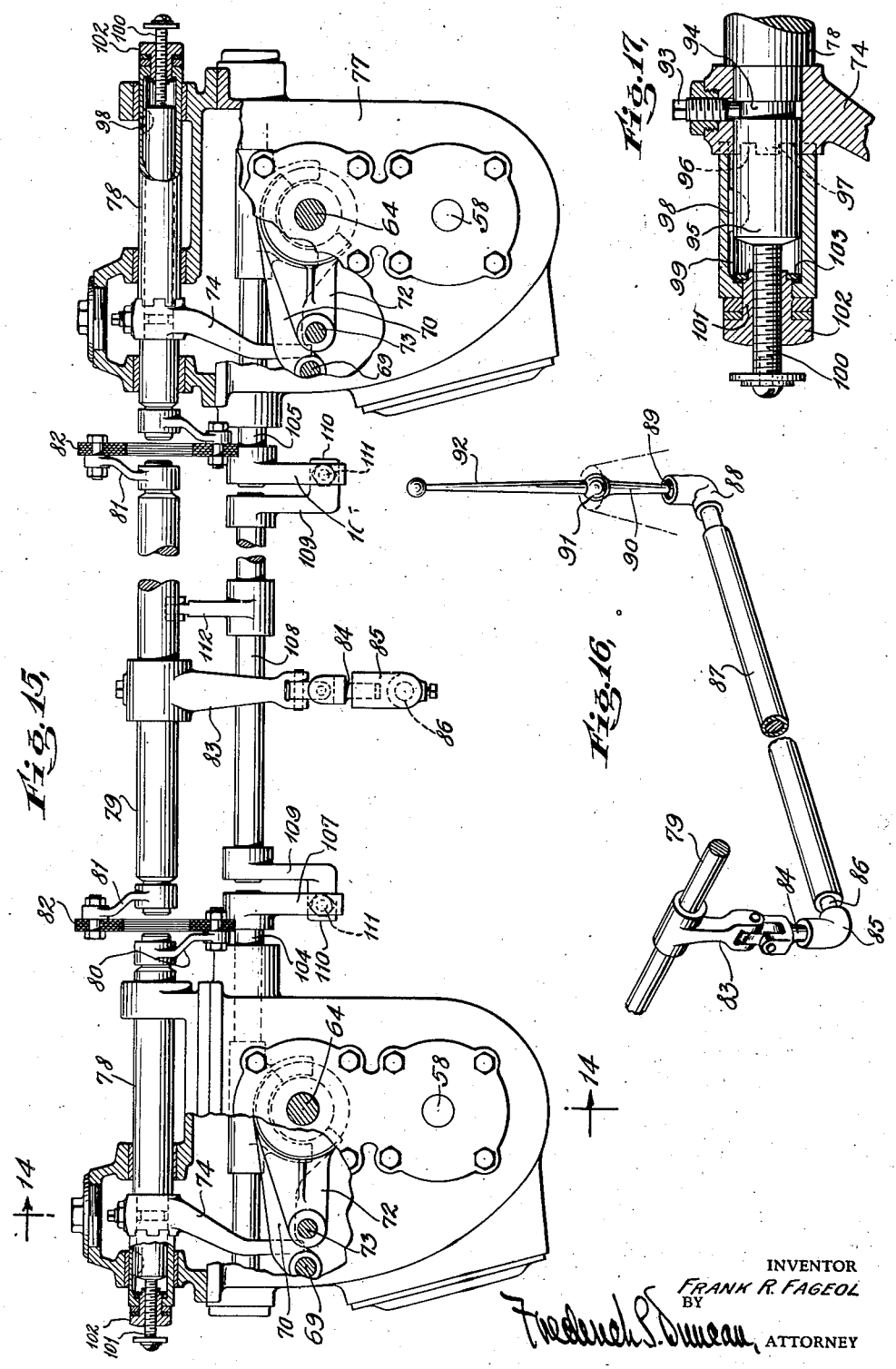
INVENTOR
FRANK R. FAGEOL
BY
Frederick S. Duncan, ATTORNEY Patented Sept. 16, 1930

1,775,754

UNITED STATES PATENT OFFICE

FRANK R. FAGEOL, OF OAKLAND, CALIFORNIA, ASSIGNOR TO TWIN COACH COMPANY, A CORPORATION OF DELAWARE

AUTOMOTIVE VEHICLE

Application filed May 13, 1927. Serial No. 191,216.

This invention relates to the construction of automotive highway vehicles having a self-contained power generating source, such as internal combustion engines or combined gas and electric power units with connected transmission and driving mechanism, and is of special value in connection with automobile busses and similar highway vehicles where passenger or similar load carrying capacity is of prime importance.

Among other important features, my invention includes a novel arrangement of frame, power and transmission devices, and also of body, seats and other parts that will increase by a third or more the passenger capacity of a bus of given length. The weight of the vehicle per load unit will also be greatly lessened, and the strength and durability of the frame, superstructure, and moving parts will be decidedly increased. This is due in part to the novel arrangement of the supporting members of the vehicle and the arrangement relative thereto of the driving motors and other comparatively heavy mechanism; the construction of the body itself and its position and length also contributing to the advantages of the structure as a whole. By the arrangement made possible by this invention, the parts are maintained in much more balanced relation than in the usual automotive bus or similar vehicle and the stresses due to unbalanced mounting of heavy parts or to carrying of unbalanced loads are largely reduced. The usual heavy chassis construction need not be employed and, in place thereof, the frame and body may be so constructed and joined that they cooperate in carrying the load which in the ordinary automotive bus has been borne substantially entirely by the chassis which has to be made correspondingly heavy. Not only do these new features help in lessening the weight of the vehicle per passenger or other load unit, but also by lessening and equalizing the stresses on the carrying and driving parts and balancing the load, they make the vehicle at once more easy riding and more durable. The invention is of special advantage in the desirable safety type of passenger automotive busses and similar highway vehicles where, to give greater stability, the frame and body are mounted as close to the ground as road conditions will permit.

A still further object is the use of two separate power generating units located on opposite sides of the vehicle, thereby allowing additional room for passengers or merchandise according to the use of the vehicle. The use of two separate power units permits the utilization of driving mechanisms located outside of the frame members which cooperate with each of the driving wheels, providing ready access to said mechanisms, and permitting removal of either one of said mechanisms as a unit, or any elements thereof, without disturbing the other, while leaving the vehicle axle and the springs intact.

Other purposes of the invention and the means by which its various objects are accomplished and its benefits realized will be referred to in the course of the following description.

In this specification and the annexed drawings, the invention is shown embodied in an automotive passenger bus of thirty-one feet six inches overall length and seven feet ten inches width and of the so-called safety type of vehicle in which, for purposes of great stability, the frame and body are as close to the ground as practicable, in this instance the floor of the body being about twenty-five inches above the roadbed. I have illustrated and described my invention in an embodiment considered by me to be preferable, but the invention may, of course, be embodied in other forms, and in and by the claims following the description I desire to cover the invention in whatsoever form it may be embodied.

In the accompanying drawings:

Fig. 1 is a view of the entire vehicle in side elevation.

Fig. 2 is a plan view showing the seating arrangement with respect to the power plants and wheel housings.

Fig. 3 is a plan view of the vehicle with the floor removed and showing the frame construction, the power plants, and particularly the lever systems for controlling the clutch, variable speed transmission, and throttles.

Fig. 4 is a detached view showing a gas-electric power plant which may be used in place of the gas engine shown in other figures.

Fig. 5 is a front end elevation of the vehicle, partly in section, showing the wheel housing.

Fig. 6 is a side view showing parts of the wall removed to illustrate the mounting of the power plants.

Figs. 7 and 8 are detail views designed to show the cooling system for the power plants.

Fig. 9 is a view, partly in section, of the inner side of one of the drive wheels, and showing the drive worm and gear.

Fig. 10 is a view in elevation, and in transverse section, showing the rear axle and wheel drive construction and the wheel housing construction.

Fig. 11 is a view showing the internal expanding brakes for the drive wheels.

Fig. 12 is a detail view showing the construction of longitudinal members, cross supporting members, floor and walls.

Fig. 13 shows a plan view of a modified form of frame construction, with the floor removed.

Fig. 13ᵃ is a side view of the same.

Fig. 14 is a longitudinal view, partly in section, showing the variable speed transmission of one of the power plants.

Fig. 15 is a detail view showing the variable speed transmissions and the controls for operating them, and also the clutch.

Fig. 16 is a detail view showing the lever system for operating the shift rod for the variable speed transmission.

Fig. 17 is a detail view in section showing the device for throwing one or both of the engines into and out of connection with the drive wheels.

The invention will be hereinafter described as embodied in a vehicle for the conveyance of passengers intended to perform the same functions as standard types of automotive stages or busses. My invention differs from the conventional type of bus propelled by a self-contained power generating unit such as an internal combustion engine or gas-electric combination in that, in place of an engine or power unit located within the frame adjacent to the forward end thereof and in advance of the body, my power mechanism is located substantially midway between the ends of the said frame. Preferably I use a pair of independent motors or power units, one on each side of the vehicle, so that the drive shaft of each motor will substantially align with one of the traction wheels on opposite sides of the vehicle, to power the vehicle by two separate driving units, which may be operated to drive the respective traction wheels either independently or in unison.

By locating the power mechanism between the front and rear axles and also by equipping the vehicle with two driving motors, there results an even distribution of weight throughout the vehicle which produces a better balance in the assembled unit. The material entering into the construction of the vehicle may therefore be lighter and thus reduce the gross weight of the vehicle below that of a conventional type of bus of an equivalent passenger carrying capacity. The arrangement of the motors at the sides of the vehicle also permits free access to the motors in order to repair or replace parts and permits the entire removal of the engine without necessitating the dismantling of the vehicle. The placing of the motors on opposite sides of the vehicle likewise permits each of the rear driving wheels to be driven independently of the other, and eliminates the complicated and weighty rear axles and driving differentials that are now a part of the conventional motor vehicle. Also the two motors can be muffled better and give off less unburned obnoxious gases when decelerating for a stop. If desired, however, particularly in smaller busses, a single power unit may be used located between the axles and at one side of the frame where ready access may be had to the motor from the side in the same manner as when two motors are used, one on each side, in which event power from the single power unit will be communicated to both driving wheels by means of a differential on the rear axle.

By locating each power unit at the side of the vehicle, they will be adjacent to the side walls of the body and can therefore be placed under a seat or seats as shown in Figs. 2, 3 and 7. This arrangement is feasible even with the low hung so-called "safety" type of automotive bus where, to obtain the stability essential for passenger and similar automotive vehicles, the frame is mounted as close to the ground as road conditions will permit. When located adjacent to the side wall of the body, the power mechanism may be mounted largely or entirely above the frame and still be placed under the seats without interfering in any way with the seating capacity of the vehicle.

By removing the engine from the front of the frame in advance of the body and placing it between the axles, the body and flooring can be extended to occupy the space where the engine was formerly located and by placing the power mechanism outside the frame either in one unit or in two separate units adjacent to and preferably partly supported by the side walls of the body, neither the aisle space nor the seating capacity is interfered with by the power or driving mechanism. By such arrangement the seating capacity of a bus having an overall length of 31' 6" is increased from 28 or 30 in the standard bus to 40 or 42 in a bus of my construction and the total carrying capacity seated and standing from about 60 to about 80.

In detail, the construction illustrated in the drawings comprises the frame of a motor vehicle, consisting of a pair of spaced, parallel channels 1 and 2 respectively, extending the length of the vehicle and joined at intervals by transverse stiffening bars 3. The parallel channels may be made much lighter than the usual chassis members. In the present construction they may be 6 inches deep at the middle of the frame, instead of 9 or 10 inches deep as in the ordinary construction. An axle 4, is arranged beneath the frame adjacent the rear end thereof, and the opposite ends of said axle are connected by interchangeable leaf springs 5 to opposite sides of the frame. The flexible connection of the axle 4 to the frame by interchangeable leaf springs forms a desirable feature of the present invention.

In the preferred form of my invention in which two independent power units are used, the opposite outer ends of the axle 4 are each provided with a housing 7, fixedly secured thereon, in which a shaft 8, is rotatably mounted. The outer end of each shaft 8 has a traction wheel 9, fixedly secured thereon. The traction wheels 9 are driving wheels which are rotated by power units on the vehicle, through the medium of a driving mechanism in the housing 7 which is located between the springs and the driving wheel 9, to move the vehicle in either a forward or reverse direction, in the manner to be hereinafter explained. As shown in Fig. 2, the forward end of the vehicle frame is likewise provided with an axle 4ª suspended therefrom, and on the outer ends of which the usual type of front wheels are mounted. This axle may desirably be located, as shown, approximately the same distance from the front end of the vehicle as the rear axle is from the rear end.

A flooring 10 is arranged across the upper face of the frame members 1 and 2 on wooden sills 6. The flooring projects beyond the outer sides of the frame members, whereby the opposite side edges of said flooring will lie substantially parallel to the frame members 1 and 2. The flooring 10 forms a part of the body 11 that is superimposed on the frame members, and the flooring and body together may extend the entire overall length of the vehicle. The body 11 is provided with side and end walls 12 and an enclosing top 13, which, in conjunction with the flooring 10, forms a complete housing to hold and seat passengers to be transported by the vehicle. The side walls 12 of the vehicle body are secured to the projecting side edges of the flooring 10, whereby, as shown in Fig. 12, said side walls 12 overhang and extend below the level of the flooring 10. The sides 12 of the body are arranged in spaced parallel alignment with the frame members 1 and 2.

The side walls 12 of the body are secured by lateral cross bars 14 and 14ª to the frame members 1 and 2, and said support members 14 and 14ª extend from side wall to side wall of the vehicle and are disposed respectively above and below the frame members 1 and 2. However some of the members 14 may be interrupted between the members 1 and 2 to provide clearance for certain parts. The side walls 12 of the body are provided at their lower edges with angle bar stiffeners 15 thereon, each of which is joined to the transverse bars 14 and 14ª to give the necessary rigidity and support to the interconnected body and frame. Angle plates 15ª are also provided to give additional bracing and stiffening effect between the members 2, 12, 14 and 14ª. The side and front walls of the body and the roof are preferably made of sheet metal stiffened at intervals with horizontal braces 12ª and vertical braces 12ᵇ both of angle iron or other suitable construction. By the use of a suitably stiffened body floor extending the overall length of the vehicle and properly balanced with respect to the front and rear axles as above described, and in part by the use in conjunction therewith of a body extending the full length of the vehicle and properly balanced as above set forth with respect to the front and rear axles and having side walls and roof portion suitably stiffened as above described, it becomes unnecessary to employ the usual separate heavy chassis construction upon which the bodies of automotive busses are ordinarily mounted; and in place thereof there can be used the relatively light frame longitudinal members above described to which the transverse floor supports and flooring and the side walls of the body are attached in my construction as above set forth.

A further means for stiffening the body and frame members is provided by the wheel housings 12ᵈ which are formed as shown in Figures 2, 5 and 10. The edges of the side members 12 of the body are provided with a flange to which the housing 12ᵈ is secured as shown in Fig. 5. The housing then curves inward and downward to meet the axle 4 between the driving gear housing 7 and the springs 5. The floor 10 is secured to the housing 12ᵈ by an angle bracket 10ª which is bolted thereto. The floor 10 is thus pressed against the side 12 of the body by the housing 12ᵈ which also provides a support for the seat 53ª of which the riser is shown in Fig. 10. These housings form braces at 4 points in the body as shown in Fig. 2 and thereby add to its rigidity.

By using a properly stiffened and balanced floor and where a body is used thereon by suitably stiffening the same and properly balancing it with respect to the axles and thus materially reducing localized strain and stress. it is possible as illustrated in Fig. 13 to still further reduce the weight of the frame construction by eliminating the continuous frame members 1 and 2 and substituting a series of short transverse members mounted on the front and rear springs and connected with the side members of the floor or of the walls of the body and a series of short longitudinal members extending between the transverse members, said transverse and longitudinal members all being relatively light as compared with the usual chassis sills or with the frame members 1 and 2 of Fig. 3. In Fig. 13, 4 and 4ª are the axles upon which are mounted the springs 5—5 upon which are mounted the transverse members 14ª—14ª. The outer ends of these transverse members are connected with the outer edge members 15ª of the floor or side wall of the vehicle. If desired, one or more other transverse members 14ᵈ may be used to extend between opposite points of the member 15ª and to support the floor and short longitudinal supporting members 1ª and 2ª. The members 14ᵈ may be used to support the engines 16 and 17. Where the floor and the body are suitably stiffened and properly balanced as above set forth, they are capable of supporting a large part of their gross weight and that of the load and the frame construction may therefore be made correspondingly lighter. It should be understood, however, that important features of my invention may be used in conjunction with the usual chassis and body construction.

Between the inside face of the overhanging side walls 12 of the body 11, and the outside face of each of the frame members 1 and 2, in the form of my invention shown in Figs. 1–12, inclusive, a space is provided in which I mount the power units for rotating the traction wheels 9. The motors 16 and 17 are mounted at corresponding points on opposite sides of the outside of the frame. The motors are preferably internal combustion engines, although it would be clearly within the purview of the invention to utilize some other type of self-contained power generator, as, for example, a combined gas-electric unit as shown in Fig. 4. In this figure the numerals 16, 16ª, b, c and d denote the gasoline engine, generator, electric motor, clutch, and rheostat control respectively.

One side of an end of each motor is secured in a bracket 18 mounted on the exterior face of each of the channels 1 and 2, respectively, of the frame, and the other side of the same end of each motor is mounted in a bracket 19, that is secured to one of the angle stiffeners 15 on the side wall 12 of the body. The motor supporting brackets 18 and 19 may be padded with some suitable resilient material to provide a cushion mounting for the motor. The forward end of each motor is supported in a bracket 20 that is secured to one of the transverse supports 14 extending across the space between the outside of the chassis and the side wall of the body.

In front of the forward end of each engine, a radiator, 17ª, and cooling fan, 17ᵇ, are arranged. If desired, the fan may be utilized to direct a current of warm air from the engine upwardly into the interior of the vehicle body to warm the air therein, as will be described below. A shaft 21 is connected to the forward end of the engine crank shaft and extends therefrom in axial alignment. The shaft 21 of one of the engines is connected by a flexible coupling 22 to a generator 23, to charge the storage batteries which supply the electricity for lighting the interior of the vehicle body and for starting the engine. An air compressor 24 is connected to the shaft 21 of the other engine by a similar coupling 22, to generate air pressure to be used in operating the brakes of the vehicle.

The rear end of each of the motors 16 and 17 is provided with a change speed gearing or transmission thereon, indicated by the numeral 25. A driven shaft 26 extends from the transmission 25 and is connected by a propeller shaft 27, operating through suitable universal joints 28, to a worm driving shaft 29ª that is rotatably mounted in the housing 7 on each of the opposite ends of the rear axle 4. A gasoline tank 17ᶜ is mounted between the frame members 1 and 2 below the level of floor 10 and is suitably connected to the motors 16 and 17. A filling pipe 17ᵈ leads from a point in the side member 12 of the body to the tank to facilitate filling.

The traction wheels 9 are secured to the tubular axle 4 in the manner shown in Figure 10. The housing 7 is secured to the extreme end of axle 4 by a plurality of bolts 7ª which permit the removal of the wheel and driving gear as a unit without disturbing the axle and springs. The shaft 8 that is rotatively journaled in the housing 7 and on which the traction wheel 9 is secured rotates in the casing 7 in substantially the same vertical plane as the axle 4. The shaft 8 is supported in the housing 7 by the anti-friction bearings 30 and 31, respectively. A worm wheel 32 is fixed on the shaft 8 within the interior of the housing 7 to mesh with the worm 29 that is connected by shaft 27 to the driving engine. Each traction wheel 9 is provided with a center hub 33 that engages the projecting end of the shaft 8 and said wheel is held on the shaft by the nut 34.

The felly 35 of the wheel 9 is arranged concentrically to the axis of the shaft 8. The wheel felly likewise extends over a portion of the housing 7 in which the shaft 8 is mounted. A pneumatic or solid tire 36 is mounted on the felly 35 on the wheel 9. A brake drum 37 is bolted to the inner face of the wheel 9, and said brake drum is arranged substantially concentric to the axis of the shaft 8. The brake drum 37 is practically concealed within the felly 35 of the wheel 9, and said brake drum 37 extends part way over an end of the housing 7 in which the worm and worm wheel are mounted. A pair of curved brake shoes 40 and 41 have a common end thereof pivotally mounted on a pin 42 that is fixed to the bottom of the housing 7. The brake shoes 40 and 41 are adapted to parallel practically the entire inner circumference of the brake drum 37. A bearing 43 is mounted on the casing 7, on the side thereof opposite to that on which the brake shoe pivot pin 42 is mounted. A shaft 44 is rotatably mounted in the bearing 43, and said shaft 44 has a cam 45 on the end thereof which is adapted to lie between the free ends of the brake shoes 40 and 41. The shoes 40 and 41 have the free ends thereof held in contact with the cam 45, by the contractile springs 46 and 47 respectively, each of which has one end thereof connected to one of the brake shoes and the other end thereof secured to the housing 7. Thus the brake shoes are held in contact with the cam 45, and out of contact with the brake drum 37. When the cam 45 is partially rotated, the brake shoes 40 and 41 are moved into frictional contact with the face of the brake drum 37 so that the rotation of the wheel 9 is stopped. This construction of wheel and brake drum permits adjustment of the brake shoes 40 and 41 by the simple means of removing the nut 34 and sliding the wheel 9 from the shaft 8.

An arm 48 is secured to the shaft 44 to effect the desired turning movement of the cam 45 and bring about the application of the brake shoes 40 and 41 to the brake drum. I prefer that the brake shoes 40 and 41 should be operated pneumatically and, to effect this desired operation, I mount a diaphragm casing 50 on the casing 7 in which an expansible diaphragm (not shown) is arranged. The diaphragm connects or contacts with a shaft 51 which is pivotally connected to the arm 48 on the shaft 44. When air pressure is supplied through the conduit 52 to the cylinder 50, the diaphragm within said cylinder is expanded, the shaft 51 is reciprocated, and the shaft 44 is partially rotated to turn the cam 45 and thus move the brake shoes 40 and 41 into contact with the brake drum. The conduit 52 that supplies compressed air to the diaphragm casing 50 is in turn connected to the compressor 24 which is operated by the motor 16.

The seating arrangement within the interior of the vehicle body 11 is made to conform to the space that remains within said body after the motors and wheels have been properly housed. Thus the body will accommodate a greater number of people than can be accommodated in a conventional bus of substantially the same dimensions.

The engine housing is formed by the seat 53 and the seat riser 53$^a$, and behind the seat back is a header tank 53$^b$, for the radiator with a filling inlet 53$^c$ in the side walls of the body. Preferably the seat and riser are lined with heat insulating material 53$^d$. A ventilating and heating system may be used in connection with the engine housing by which the air from the interior of the vehicle can be drawn by the fan 17$^b$ through openings 53$^e$ in a seat riser and either discharged into the air through the radiator 17$^a$, around the engine and out of the louvers 54$^a$ or be diverted by a duct 53$^f$ and discharged after being heated by contact with the radiator and by proximity to the engine into the vehicle through other openings 53$^g$ in a seat riser, which openings can be closed by a perforated slide 53$^h$, in which event all of the air drawn through the openings 53$^e$ will be discharged over the engine into the open air. Due to the fact that the air passing into duct 53$^f$ does not pass around the engine, the noxious gases from the engine are not drawn into the bus with the heated air. The gases are taken out through the louvers 54$^a$.

The side walls 12 on the opposite sides of the vehicle body are arranged so that panels 54 therein with louvers 54$^a$ may be removed to permit free access to each of the power plants to effect repairs or adjustments thereof. When the covering panels are in position, the motors are concealed from outward view so that it is practically impossible to discern in what part of the vehicle body the driving motors are located.

In the illustrated embodiment of my invention, it will be seen that instead of using a single large internal combustion engine mounted at the forward end of the chassis over or just behind the front axle and mounting on the chassis a body, the forward end of which is at the rear end of the engine, all of which is the common usage in construction of automotive vehicles of this type, two smaller gas engines are used and are located about midway between the front and rear axles and each at one side of the frame at a point close to the side wall of the body. The frame members that support the body extend the same length as the usual sills of the chassis, but in the present case the body and its flooring are extended the full length of the frame, the forward part of the body occupying the space ordinarily occupied by the engine, thus adding very largely to the available floor or load space of the vehicle, a most important factor in road vehicles of this class. By reducing the size of the power units and mounting them at the sides of the body, they can be located under seats and thus neither impede the usual center aisle nor in any way interfere with the full utilization for seating purposes of the increased floor area of the vehicle. By locating the power unit near the center of the vehicle, instead of at the front, the front axle can be moved back along the frame to a point substantially the same distance from the front as the rear axle is from the rear end of the frame. This results, both when the vehicle is empty and when it is loaded, in a substantially even distribution of weight with respect to the axles and a great reduction of stresses upon the frame members which permits of the material lessening of their size and weight above described. The extension of the body to cover the whole or substantially the whole of the frame, including the portion extending ahead of the front axles makes possible, by suitable interlocking of the body with the frame members, a substantial participation of the body itself in the load supporting action of the structure, again permitting the use of the lighter frame members. This is in marked contrast with the conventional bus construction in which the forward end of the body terminates at a point on the frame substantially back of the front axle, and the entire weight at that point is carried by the chassis sills which must be made heavy enough to perform this duty. Another desirable result of the better balancing in my construction of the load both in the empty and in the filled vehicle is that the various vertical, horizontal and twisting stresses to which the frame members and the body are subjected are greatly reduced, the liability to sudden breaking or gradual giving way is lessened, and the life of the vehicle correspondingly increased.

The better balance also tends to lessen the jerky vertical rebounds present in the overhanging rear portions of the usual bus and to impart to the present construction an easier riding motion. The location of the front axle at a distance from the front of the vehicle also permits of the use of longer front springs than in the conventional practice, which adds to the ease of riding.

Another benefit resulting from the shortening of the wheel base due to moving the front axle back along the frame (which in turn is made possible by the locating of the power unit near the center of the automobile) is the greater ease in turning that is thereby imparted to the vehicle. Another factor adding to the more perfect control of the vehicle is the locating of the driver's seat and steering wheel at the very front of the vehicle where an unobstructed view may be had of traffic conditions even immediately ahead and in close proximity to the front of the vehicle, thus enabling the driver to judge distances and avoid accidents to a degree not possible to the ordinary automobile with the engine located in advance of the body.

By locating both the front axle and wheels and the back axle and wheels a considerable distance from their respective ends of the vehicle frames, front and rear doors 12ᶜ may be used located respectively in front of the front wheels and behind the rear wheels. This is of decided advantage in the loading and unloading of passengers. To conform to this arrangement, the steering wheel is located ahead of the front axle and the drag link 123 extends rearwardly instead of forwardly as in the conventional practice.

By dividing the power plant into two units, each drive wheel may be independently operated and the usual complicated and easily disarranged differential mechanism may be dispensed with. By driving the rear wheels from power units located near the middle of the frame instead of near the front, the transmission elements or shafts are shorter and less complicated and the stresses to which they are subjected and the resulting wear and tear are materially reduced. The practice of dividing the power units also enables the mounting of the driving gears outside of the frame, thereby facilitating adjustment and repair of the parts. Also due to the dividing of the power units a means has been provided whereby one unit may be disconnected from its respective driving gears in the case of an emergency and the vehicle continue to operate through the medium of the other unit until repairs may be made to the disabled unit.

In Figs. 3, 14, 15 and 16 I illustrate a system of controls whereby the engines may be operated together as a unit or separately, as may be desired. As hereinbefore stated, the type of power plant which I have selected as the preferable embodiment of the invention comprises two internal combustion engines, one on each side of the vehicle, each engine being connected to a rear wheel separately driven. The particular engines which I illustrate are of the vertical reciprocating type, and power is transmitted by each engine to its corresponding drive wheel through a clutch of any conventional type, and speed variation is obtained by a transmission of the selective sliding gear type, which is capable of three speeds forward and one speed in reverse. This system of engine release and speed variation, therefore, necessitates two control systems, one for the clutches and the other for the variable speed transmissions. There is, in addition, a control system for the throttles which will be later referred to. Describing, first, the control system for the variable speed transmission, each engine is provided with a separate mechanism of this character, which may be rights and lefts, or similar as desired. In the figures referred to, the transmissions are similar and, therefore, it is necessary to describe in detail only one of them, except insofar as may be necessary to clearly explain the operation of the controls with respect to both. A suitable gear box or enclosure for the transmission gears and their mountings is provided and, into this box, extends the usual shaft 55 carrying the gear 56. The gear 56 is in constant mesh with the gear 57, which is mounted on the countershaft 58 carrying fixedly mounted thereupon the first or low speed gear 59, the second or intermediate speed gear 60, and the reverse gear 61, which is in constant mesh with the reverse pinion 62 fixedly mounted on the shaft 63. The splined shaft 64 has a bearing in the shaft 55, and also at 65 in a wall of the gear box. The splined shaft 64 carries the sliding gear 66 provided with the teeth 67, which are adapted to engage with the teeth 68 for third or high speed. The gear 66 may be caused to slide back and forth along the splined shaft 64 and thus cause the teeth 67 to mesh with the teeth 68 or to cause the gear itself to mesh with the gear 60. A convenient means of securing this sliding motion may consist of the slidably mounted rod 69 carrying the yoke 70, which rotatably engages a groove located at the side of the gear 66. In a similar fashion, the gear 71 is mounted on the splined shaft, and this may be caused to slide forward and engage with the gear 59 for low or first speed or rearwardly to engage the pinion 62 for reverse, as may be desired. The means for sliding this gear are similar to the means for sliding the gear 66; that is to say, a yoke 72 is carried by the slidably mounted rod 73, and this yoke engages with a groove at the side of the gear 71 in the same manner as in the case of the gear 66.

Each of the slide rods 69 and 73 is provided with suitable means to permit engagement therewith by the shift finger 74, such means consisting of the transverse groove or slot 75 in the slide rod 69, and a similar slot or groove 76 in the slide rod 73. These slots or grooves are so positioned with respect to each other that, when the gears 66 and 71 and the teeth 67 are wholly disengaged from the gears and teeth with which they are intended to mesh; that is to say, when they are in neutral position, the slots or grooves are in registry or, in other words, in transverse alignment with each other so that the finger 74 may be readily caused to slide from one to the other for operating whichever one of the slide rods that may be selected. The variable speed mechanism thus far described is of a conventional design and is selected for illustration merely for that reason. It is to be understood, however, that the invention is not confined to any particular type of variable speed mechanism.

To operate the variable speed mechanisms, it is, therefore, necessary to cause the finger 74 and also a corresponding finger in the opposite gear box 77 to move transversely with respect to the slide rods 69 and 73, when the grooves in these rods are in alignment, and also to have a forward and rearward motion when in each groove, to bring about the desired gear connections. The forward and rearward motion of the fingers is in my preferable embodiment of the invention secured by rotation of the fingers. The desired motion of the fingers is attained by imparting a sliding motion and a rotary motion to the shafts 78 on which the fingers 74 are mounted. In the mounting of these fingers, I have provided for a locking mechanism for normally preventing them from rotating on the shaft, which will be later described. For the present, it may be assumed that these fingers are rigidly connected with the shafts 78.

The shafts 78, which are mounted as shown in Fig. 15 on the gear box, together with the shaft 79 virtually constitute a unit shaft but, in order to make allowance for misalignment of bearings due to weaving of the frame and other causes of distortion, I interpose universal joints at convenient places, which joints may be of any suitable design, such as that shown; that is to say, the adjacent ends of each shaft may be provided with spiders 80 and 81, which engage with the fabric disc 82; this joint permitting considerable misalignment of the shaft sections and also causing all of the sections to rotate and slide with each other, when motion is imparted to one of them.

For imparting rotary and sliding motion to the shaft 79 and, hence, to the fingers 74, I fixedly mount on the shaft 79 a finger or lever 83 having, as shown, universal joint connection with the rod 84, which is slidably carried in the tubular elbow 85. The tubular elbow 85 is fixedly mounted on the rod 86 which, in turn, is slidably and rotatably mounted in the tube 87, suitably fastened to a fixed portion of the vehicle. The opposite end of the rod 86 carries another tubular elbow 88 in the bore of which operates the ball 89 of the shift lever or "wobble stick" 90. The shift lever is mounted for universal oscillation by means of the ball 91 seated in a socket in the usual manner. By swinging the arm 92 of the shift lever transversely of the vehicle, the fingers 74 are given a transverse movement for selecting the particular one of the slide rods 69 and 73 that may be desired and then, by swinging the shift lever backwards or forwards, the particular gear connection desired may be established.

It is frequently necessary or desirable to disconnect one engine entirely from its corresponding drive wheel. To accomplish this purpose, I provide the arrangement shown in detail in Fig. 17. The fingers 74 are mounted on the shafts 78, so that the fingers are rotatable but are prevented, by the screws 93 operating in the grooves 94, from moving longitudinally of the shaft. The fingers 74, however, are normally locked against rotation on the shafts 78 by means of the locking member 95, which has teeth 96 adapted to engage with teeth 97 on the fingers. The locking member 95 is provided with a key 98, which is adapted to travel in the groove 99 and is also provided with a threaded stem 100. The threaded stem engages with a nontraversing nut 101 and, as the nut is turned in either direction, it is prevented from traveling by its head 102 or the flange 103, according to the direction of rotation. By turning the nut to the right, assuming that the thread is right-handed, the locking member 95 is withdrawn from engagement with the fingers 74 and, if the fingers 74 be in neutral position when this is done, further rotation of the shafts 78 causes no rotation of the fingers 74 and, therefore, one or both engines may be wholly disconnected from their corresponding drive wheels.

The particular type of clutch that may be used is not of importance, so far as the scope of the invention is concerned. The details of the clutches are not shown, but it may be assumed that they are to be operated by rotation of the shafts 104 and 105 and that they are normally held in clutching engagement by yielding means in the conventional manner. Each of the shafts 104 and 105 is provided with a lever arm 106 and 107. A cross shaft 108, mounted in bearings depending from any fixed portion of the vehicle, is provided with lever arms 109, the ends 110 of which are provided with adjusting screws 111, which normally merely contact with the lever arms 106 and 107, or there may be slight clearance, if desired. Obviously, when the shaft 108 is rotated in a direction to cause the set screws to bear against the lever arms 106 and 107, rotation of the shafts 104 and 105 will take place and declutching will result.

Rotation of the shaft 108 may be effected by means of the lever arm 112 and rod 113, which is operated by a suitable train of levers not shown in detail, leading from the clutch pedal 114.

The throttle control is best illustrated in Fig. 3, and the arrangement is such that the throttles may be operated separately, or both together, or differentially as may be desired. From each of the throttles 115, there leads a lever train comprising the link 116, the lever arm 117, the cross shaft 118, the lever arm 119, the pull rod 120, the lever arm 121, the cross shaft 122, the link 123, and the pedal 124. The lever trains for the throttles are alike, and the pedals are placed side by side so that their combined transverse dimension would be about that of the width of the shoe of the operator. The operator may, therefore, press both pedals at once, or each one separately, by tipping his foot to the right or left, as required, thereby securing a differential opening of the two throttles.

Having described my invention as embodied in what I now consider a preferred form, to the details of which I do not intend to limit myself as the invention is manifestly capable of embodiment in varying forms with differing details, what I claim as my invention and desire to patent is as follows:

1. In an automotive road passenger bus having front and rear axles with wheels thereon and frame members supported on said axles and a flooring and body connected to and supported by said frame members, said flooring and body extending substantially the entire length of the vehicle and providing an uninterrupted aisle of unbroken level extending substantially from end to end of the vehicle, and having seats for passengers located on the floor of the body, two independent power units each comprising an internal combustion engine as the initial source of power and each located at one side of the vehicle and projecting above said floor so as to be housed beneath a seat therein, and power transmission mechanism independently connecting each power unit with and actuating a separate driving wheel.

2. In an automotive road vehicle having front and rear axles with wheels thereon and frame members supported on said axles and a flooring connected to and supported by said frame members, said flooring and supporting parts extending substantially the entire length and width of the vehicle at the same level, two independent power units each comprising an internal combustion engine as the initial source of power and each located at one side of the vehicle between the front and rear axles thereof and at a substantial distance from both and projecting above said floor level, power transmission mechanism independently connecting each power unit with and actuating a separate driving wheel, and mechanism for effecting either combined or individual control of said power units.

3. In an automotive road vehicle having front and rear axles with wheels thereon and frame members supported on said axles and a flooring connected to and supported by said frame members, said flooring extending substantially the entire length and width of the vehicle at the same level, self-generating power mechanism comprising an internal combustion engine as the initial source of power located at one side of the vehicle and approximately midway between the front and rear axles and projecting above said floor level, and power transmission mechanism connecting the power generating mechanism with and actuating the driving wheels.

4. In an automotive road vehicle having front and rear axles with wheels thereon and frame members supported on said axles and a flooring connected to and supported by said frame members, said flooring extending substantially the entire length and width of the vehicle at the same level, self-generating power mechanism comprising an internal combustion engine as the initial source of power located at one side of the vehicle and projecting above said floor level under a seat therein and approximately midway between the front and rear axles, and power transmission mechanism connecting the power generating mechanism with and actuating the driving wheels.

5. In an automotive road vehicle a balanced construction comprising front and rear axles with wheels thereon, a flooring frame extending in front of the front axle approximately the same distance as it extends to the rear of the rear axle, the combined extension in front of the front axle and to the rear of the rear axle approximating the distance between front and rear axles, and self-contained power generating mechanism located between said axles so that the weight thereof is substantially equally distributed on said axles and provided with power transmission means connecting the power generating mechanism with and actuating the driving wheels.

6. In an automotive road vehicle a balanced construction comprising front and rear axles with wheels thereon, a flooring frame extending in front of the front axle approximately the same distance as it extends to the rear of the rear axle, the combined extension in front of the front axle and to the rear of the rear axle approximating the distance between front and rear axles, and self-contained power generating mechanism consisting of two separate units each containing an internal combustion engine projecting above said frame and widely spaced apart laterally and each located at one side of the vehicle and between said axles and each provided with power transmitting means connecting the generating unit with and actuating the driving wheels.

7. In an automotive road vehicle a balanced construction comprising front and rear axles with wheels thereon, a flooring frame extending in front of the front axle approximately the same distance as it extends to the rear of the rear axle, the combined extension in front of the front axle and to the rear of the rear axle approximating the distance between front and rear axles, and self-contained power generating mechanism consisting of two separate units each containing an internal combustion engine projecting above said frame and widely spaced apart laterally and each located at one side of the vehicle and between said axles and each provided with power transmitting means connecting the generating unit with and actuating the driving wheels, and mechanism connecting the separate power transmitting mechanism and effecting the unitary control of the same.

8. In an automotive road vehicle two independent power units each comprising an internal combustion engine as the initial source of power, a throttle mechanism comprising an individual throttling device for each engine, a pair of pedals, and a system of connecting rods between said throttling devices and said pedals, the relative location of said pedals being such that they may be operated jointly or independently by the operator to provide joint or independent control of the engines at will.

9. In an automotive road vehicle having front and rear axles with wheels thereon and frame members supported on said axles and a flooring connected to and supported by said frame members, two independent power units each comprising an internal combustion engine as the initial source of power and each located at one side of the vehicle, and a power transmission mechanism consisting of a pair of gear trains, a cross shaft having a finger secured to each end thereof, said fingers being actuated by said shaft to vary the relation simultaneously in each gear train to transmit power at varying speeds from each of said power units to actuate a separate driving wheel.

10. In an automotive road vehicle two independent power units each comprising an internal combustion engine as the initial source of power, a power transmission mechanism comprising a pair of variable speed gear trains, a cross shaft having a universal coupling intermediate the end thereof, a pair of fingers secured to said shaft, said shaft actuating said fingers to vary the relation simultaneously in each gear train, thereby transmitting power at varying speeds from each of said power units to actuate a separate driving wheel, and means contained in said cross shaft for making either of said fingers inoperative.

11. In an automotive road vehicle two independent power units each comprising an internal combustion engine as the initial source of power, a power transmission mechanism comprising a pair of variable speed gear trains, a cross shaft having a finger secured to each end thereof by a slidable locking member, said locking member being held in engagement with said finger by a series of teeth, said fingers being actuated by said cross shaft to vary said gear trains simultaneously, thereby transmitting power at variable speeds from each of said power units to a separate driving wheel of said vehicle, and either one of said gear trains being made ineffective by the disengagement of its respective finger from engagement with said cross shaft by the release of said locking members.

12. In an automotive road vehicle a pair of self-contained power units located at opposite sides of said vehicle, a variable transmission connected to each of said units, a cross shaft with operating means thereon for varying said transmission, a hand lever adapted to have a circular motion about a pivot, and means for connecting said lever to said cross shaft to slide said shaft transversely and rotate the same, thereby operating said transmission varying means.

13. In an automotive road vehicle a pair of self-contained power units located at opposite sides of said vehicle, a variable transmission connected to each of said units, a cross shaft with operating means thereon for varying said transmission, a lever secured to said cross shaft, a universal joint, a rod, said rod having a ball and socket joined at one end thereof and being connected by said universal joint to said lever at its other end, the ball of said joint being formed on the extreme end of a hand lever, and said whole mechanism being adapted to slide said shaft transversely and rotate the same to operate said transmission varying means.

14. In an automotive road vehicle having front and rear axles and a floor supported thereby, a pair of seats located respectively at each side of the floor and intermediate between the axles, and a self-contained power generating unit for driving the vehicle housed within each seat.

15. In an automotive road vehicle having front and rear axles with wheels thereon and a floor supported by the axles, a pair of self-contained power generating units at each side of the floor for driving the vehicle, said units lying between the axles substantially in line with the wheels, and a seat over each power unit.

16. In an automotive road vehicle having front and rear axles, a body supported by the axles, the body having a floor providing an aisle of unbroken level extending substantially the entire length of the vehicle with a seat at each side of the floor, and a pair of self-contained power generating units for driving the vehicle supported by the body between the axles and respectively housed within the seats.

17. In an automotive road vehicle having front and rear axles with wheels thereon, a body supported on the axles, the body having a floor providing an uninterrupted aisle of unbroken level extending substantially the entire length of the vehicle and having also a seat at each side of the floor, a pair of self-contained power generating units supported by the body between the axles and respectively housed within the seats, and power transmitting mechanism independently connecting each power unit with and separately actuating one of said wheels.

18. In an automotive road vehicle having front and rear axles with wheels thereon, a body supported on the axles, the body having a floor providing a center length of unbroken level extending substantially the entire length of the vehicle with a seat at each side of the floor, a pair of self-contained power generating units supported by the body between the axles and respectively housed within the seats, and power transmitting mechanism independently connecting each power unit with and separately actuating one of said wheels.

19. In an automotive road vehicle having front and rear axles with wheels thereon, a frame supported by the axles, a floor having a common level supported on said frame and formed with a recess at each side thereof between the axles, a self-contained power generating unit in each recess, and power transmitting mechanism independently connecting each power unit with a separate one of said wheels.

20. In an automotive road vehicle having front and rear axles with wheels thereon, a main frame supported by the axles, a floor supported thereon, two independent self-contained power units between the axles and located respectively exterior to and on opposite sides of the frame, the floor having openings therein through which said units project, and transmission mechanism also exterior to said frame independently connecting each power unit with and separately actuating one of said wheels.

21. In an automotive road vehicle having front and rear axles with wheels thereon, a pair of main longitudinal frame members supported in mutually spaced relation by the axles, a pair of outer longitudinal frame members carried by the main frame members and located respectively on opposite sides of the main frame members, a self-contained power generating unit mounted between each outer frame member and the adjacent main frame member, and power transmission mechanism connecting each power unit with and separately actuating one of said wheels.

22. In an automotive road vehicle having front and rear axles with wheels thereon, a pair of main longitudinal frame members supported in mutually spaced relation by the axles, a pair of outer longitudinal frame members carried by the main frame members and located respectively on opposite sides of the main frame members, a self-contained power generating unit mounted between each outer frame member and the adjacent main frame member, power transmission mechanism connecting each power unit with and separately actuating one of said wheels, and means extending between said main frame members for controlling said power units 23. In an automotive road vehicle having front and rear axles with a wheel at each end of each axle and a frame supported by the axles and a floor extending substantially the full length of the vehicle, a self-contained power generating unit supported at one side of the frame between the axles and substantially in alignment with the wheels on said side, power transmitting mechanism connecting said unit with one of the wheels aligned therewith, said power unit projecting above the level of said floor, and a seat covering said power unit.

24. In an automotive road vehicle having axles with wheels thereon, a frame supported by the axles, a side wall carried by the frame, a self-contained power unit supported on one side by the frame and on the other by the side wall, and means connecting the power unit with one of said wheels for driving the same.

25. In an automotive road vehicle having front and rear axles with wheels thereon, a frame carried by the axles, side walls carried by the frame, a self-contained power unit located between the axles and supported on one side by the frame and on the other by one of said side walls, and power transmitting mechanism connecting the power unit with one of said wheels.

26. In an automotive road vehicle having front and rear axles with wheels thereon, a frame supported by the axles, a floor carried by the frame, a pair of side walls also carried by the frame, the floor being formed with an opening adjacent each side wall, a power unit in each opening and supported on one side by the adjacent side wall and on the other by the frame, a seat covering each opening, and power transmitting means independently connecting each power unit with a separate one of said wheels.

27. In an automotive road vehicle having front and rear axles and a body supported thereby, said body including a floor of unbroken level extending substantially the entire length of the vehicle and also having side walls projecting below the floor level, a pair of independent self-contained power units carried by the body between said axles and respectively adjacent each side wall, said power units extending above the floor level, and a seat over each power unit, the side walls being formed with movable panels to provide access to the power units.

28. In an automotive road vehicle a balanced construction comprising front and rear axles with wheels thereon, a body supported by the axles and extending in front of the front axle aproximately the same distance as it extends to the rear of the rear axle, the combined extension in front of the front axle and to the rear of the rear axle approximating the distance between the front and rear axles, self-contained power generating units supported by the body at each side thereof and substantially midway between said axles, said units being substantially in alignment with the front and rear wheels, and power transmitting means operatively connecting each unit with a separate one of said wheels.

29. In an automotive road vehicle a fixed axle having a pair of spring pads thereon, a body spring supported on said pads, two independent live axles supported by the fixed axle in vertically offset relation thereto and respectively at opposite ends thereof, a wheel secured to each live axle, two self-contained power generating units carried by the body and located respectively at opposite sides thereof respectively in substantial alignment with the wheels, each power unit including a drive shaft extending to the adjacent live axle, and means between the wheels and the spring pads for operatively connecting each drive shaft to the adjacent live axle.

30. In an automotive road vehicle having front and rear axles, a body supported by the axles, said body having a floor providing an aisle of unbroken level extending substantially the entire length of the vehicle with a seat at each side of the floor, and a pair of self-contained power generating units for driving the vehicle supported by the body between the axles and respectively housed within the seats, said body extending a substantial distance in front of the front axle and having a door therein in front of the front axle.

31. In an automotive road vehicle having front and rear axles, a body supported by the axles, said body having a floor providing an aisle of unbroken level extending substantially the entire length of the vehicle with a seat at each side of the floor, and a pair of self-contained power generating units for driving the vehicle supported by the body between the axles and respectively housed within the seats, said body extending a substantial distance in front of the front axle and to the rear of the rear axle and having a door in each of such extending parts.

32. An automotive road vehicle comprising a rigid box-like body, a pair of axles having wheels thereon arranged beneath said body and housed thereby, springs interconnecting said axles and body, two independent internal combustion engines each located within and supported by said body with their drive shafts approximately in alignment with said wheels, separate power transmission mechanism between each engine and a wheel on the same side of the vehicle, and means to control said engines and mechanisms.

33. An automotive road vehicle comprising a rigid box-like body consisting of spaced longitudinal members, sides spaced laterally in opposite directions from said longitudinal members, ends and a roof of relatively light structural material rigidly connected together, a pair of axles having wheels thereon arranged beneath said body and housed thereby, springs interconnecting said axles and body, two independent internal combustion engines located within said body and supported by a longitudinal member and a side, and power transmission mechanism between each engine and a wheel on the same side of the vehicle.

34. An automotive road vehicle comprising a rigid box-like body constructed of relatively light structural material, a pair of axles carrying wheels arranged beneath said body and spaced substantially equal distances from the ends thereof, and housed thereby, with said wheels arranged in recesses in said body, self-contained power means disposed within said body between said axles and adjacent a side thereof, and transmission mechanism between said power means and certain of said wheels, said transmission mechanism being arranged adjacent a side of said body.

35. An automotive road vehicle comprising a rigid frame, a pair of axles carrying wheels arranged wholly beneath said frame, said axles being spaced substantially equal distances from the ends of said frame, springs interconnecting said axles and frame, a pair of self contained power units supported on said frame between said axles in substantial lateral spaced relation and arranged adjacent the sides of said frame, power transmission mechanism between each power unit and one of said wheels, and mechanism for effecting unitary control of said transmission mechanism and of said power units.

36. An automotive road vehicle comprising a frame consisting of longitudinal and transverse members rigidly connected together, axles arranged entirely beneath said frame, springs connecting said axles and frame, a pair of wheels secured to each axle with their axes in vertical off-set relation with respect to the frame supporting portions of said axles, said wheels being disposed wholly within said frame, a pair of internal combustion engines arranged at the sides of said frame but substantially spaced laterally from each other and secured to said frame between said axles and independent mechanism for separately operatively coupling each engine with a wheel at the same side of the frame, and means for effecting unitary control of said engines and mechanisms.

37. An automotive road vehicle comprising a passenger carrying box-like body, axles carrying wheels arranged beneath said body and spaced substantially equal distances from the ends thereof and housed thereby with the wheels projecting above the floor line of and into the body, self-contained power generating means supported and housed by said body substantially centrally between the axles, and projecting into the body substantially above the floor line thereof, and mechanism to operatively connect said power means and certain of said wheels.

38. An automotive road vehicle comprising a passenger carrying box-like body, axles carrying wheels arranged beneath said body and spaced substantially equal distances from the ends thereof and housed thereby with the wheels projecting above the floor line of and into the body, a pair of internal combustion engines supported and housed by said body, each engine being positioned substantially centrally between the axles and adjacent the sides of the body and so that each engine projects into the body substantially above the floor line, and a drive shaft connecting each of said engines with one of the wheels supporting said body.

39. An automotive road vehicle comprising a passenger carrying body of box-like form, a pair of axles supporting said body, each axle being spaced substantially the same distance from an end of said body, springs connecting the axles and body, a pair of wheels supporting each axle and mounted for rotation about an axis located substantially above the axle to which it is attached, each wheel projecting above the floor line of said body and being housed thereby, a pair of self-contained power generating units supported by and projecting above the floor line of said body within the body so as to be housed thereby, said power units being spaced widely apart transversely of the vehicle, and drive shafts and mechanism coupling each power unit with a wheel on the same side of the vehicle, each drive shaft being operatively connected to a wheel between its inner side and one of said springs.

40. An automotive road vehicle comprising a passenger carrying body of box-like form, an axle supporting each end of said body, each axle being disposed substantially centrally between the mid portion of the body and one end thereof, and self-contained power generating means supported by said body and projecting therein above the floor line thereof so as to be housed thereby, said power means being arranged so that its weight is distributed substantially equally on said axles.

41. An automotive road vehicle comprising a passenger carrying body of box-like form, an axle supporting each end of said body, each axle being disposed substantially centrally between the mid portion of the body and one end thereof, and a pair of internal combustion engines supported by said body and housed thereby, said internal combustion engines being arranged so that their weight is distributed substantially equally on said axles.

42. A road vehicle comprising forwardly and rearwardly disposed axles, a pair of road wheels supporting each axle, a passenger carrying body supported on said axles and projecting a substantial distance forwardly of the wheels that support said forwardly disposed axle, a self-contained power generating mechanism supported by said body and means operatively connecting said mechanism and certain of said wheels, an operator's seat in said forwardly projecting portion of said body, and a passenger entrance opening through a side of said body opposite said seat and in front of the wheel on the forwardly disposed axle that is located at that side of said body.

43. A road vehicle comprising a passenger carrying body, an axle supporting each end of said body, a pair of wheels on each axle, each axle being disposed substantially centrally between the mid portion of the body and one end thereof so that said body projects substantially beyond the axles, a self-contained power generating mechanism supported by said body and means operatively connecting said mechanism and certain of said wheels, an operator's seat in the forward end of said body and a passenger entrance in said body in front of a wheel on the forward axle and opposite said seat whereby a balanced construction is provided permitting operation and loading of the vehicle at a point substantially in front of the forward axle and providing passenger carrying space over said forward axle.

In testimony whereof, I have signed this specification.

FRANK R. FAGEOL.